United States Patent
Delaite et al.

(12)

(10) Patent No.: US 6,326,459 B1
(45) Date of Patent: Dec. 4, 2001

(54) PROCESS OF POLYMERIZATION BY OPENING OXYGENATED RINGS, USING A CATALYTIC COMPOSITION BASED ON A GRAFTED METAL OXIDE

(75) Inventors: Christelle Delaite, Lyons; Thierry Hamaide, Vienne; Roger Spitz, Lyons; Karine Tortosa, Villeurbanne, all of (FR)

(73) Assignee: Rhodia Chimie, Boulogne Billancourt, Cedex (FR)

( * ) Notice: Subject to any disclaimer, the term of this patent is extended or adjusted under 35 U.S.C. 154(b) by 0 days.

(21) Appl. No.: 09/529,525

(22) PCT Filed: Oct. 12, 1998

(86) PCT No.: PCT/FR98/02181

§ 371 Date: Jul. 23, 2000

§ 102(e) Date: Jul. 23, 2000

(87) PCT Pub. No.: WO99/19064

PCT Pub. Date: Apr. 22, 1999

(30) Foreign Application Priority Data

Oct. 14, 1997 (FR) .................................................. 97 12827

(51) Int. Cl.$^7$ .......................... C08G 63/08; C08G 63/82; B01J 31/00
(52) U.S. Cl. .......................... 528/357; 528/354; 528/355; 528/359; 502/152
(58) Field of Search .................................... 528/354, 355, 528/357, 359; 502/152

(56) References Cited

U.S. PATENT DOCUMENTS

| 4,960,744 | * | 10/1990 | Duranel et al. | 526/125 |
| 5,043,514 | * | 8/1991 | McDaniel et al. | 585/511 |
| 5,288,841 | * | 2/1994 | Bellis et al. | 528/275 |
| 5,563,225 | * | 10/1996 | Spitz et al. | 526/116 |
| 6,057,258 | * | 5/2000 | Spitz et al. | 502/152 |
| 6,060,633 | * | 5/2000 | Chen et al. | 585/475 |

FOREIGN PATENT DOCUMENTS

| 0 230 983 | 8/1987 | (EP) . |
| 0 776 699 | 6/1997 | (EP) . |
| WO 95/29755 | 11/1995 | (WO) . |

* cited by examiner

Primary Examiner—P. Hampton-Hightower
(74) Attorney, Agent, or Firm—Jean-Louis Seugnet

(57) ABSTRACT

The invention relates to a composition based on a grafted metal oxide, its preparation and its use in a process of polymerization by opening oxygenated rings such as alkyl oxides, cyclic esters or cyclic carbonates. The composition comprises a support chosen from the group of metal oxides capable of containing hydroxyl functions, onto which is grafted a group of formula (1) —$M(OR)_n$ in which M is an element chosen from scandium, zirconium, hafnium, niobium, tantalum, rare-earth metals and actinides, R is an organic group and n is an integer greater than or equal to 1. The composition is prepared by forming a suspension of the abovementioned support and then placing in contact and reacting this suspension with a compound of formula (2) $M(OR)_{n+1}$ in which M, R and n are defined as above.

12 Claims, No Drawings

PROCESS OF POLYMERIZATION BY OPENING OXYGENATED RINGS, USING A CATALYTIC COMPOSITION BASED ON A GRAFTED METAL OXIDE

This application is an application under 35 U.S.C. Section 371 of International Application Number PCT/FR98/02181 filed on Oct. 12, 1998.

BACKGROUND OF THE INVENTION

1. Field of the Invention

The present invention relates to a catalytic composition based on a grafted metal oxide, to its preparation and to its use in a process of polymerization by opening oxygenated rings.

2. Description of the Related Art including information disclosed under 37 C.F.R. 1.97 and 1.98

Polymerization by opening oxygenated rings, for example lactones or lactides, is well known. Metal alkoxides are used as initiators, for the reaction. These initiators are used in homogeneous medium and they have been found to be effective. However, they have drawbacks. Firstly, their solubility is low. In addition, during their use, aggregations of the alkoxide molecules occur, leading to the existence of several families of active centres, which has the consequence of producing a wider molecular mass distribution of the polymer obtained. Finally, it is occasionally difficult to separate the initiator from the polymer formed, thereby compromising the purity of this polymer.

It would thus be desirable to have available a heterogeneous catalyst.

One object of the invention is to provide such a catalyst.

BRIEF SUMMARY OF THE INVENTION

With this aim, the composition of the invention comprises a support chosen from the group of metal oxides capable of containing hydroxyl functions, onto which is grafted a group of formula (1) —M(OR)$_n$ in which M is an element chosen from scandium, zirconium, hafnium, niobium, tantalum, rare-earth metals and actinides, R is an organic group and n is an integer greater than or equal to 1.

The invention also relates to a process for preparing this composition, which is characterized in that a suspension of the abovementioned support is formed and this suspension is then placed in contact and reacted with a compound of formula (2) M(OR)$_{n+1}$ in which M, R and n are defined as above.

Finally, the invention relates to a process of polymerization by opening oxygenated rings, which is characterized in that a composition as defined above is used as catalyst, in the presence of a protic compound.

Other characteristics, details and advantages of the invention will emerge even more fully on reading the description which follows, as well as the various concrete but non-limiting examples intended to illustrate it.

DETAILED DESCRIPTION OF THE INVENTION

The composition of the invention comprises a support which is chosen from the group of metal oxides capable of containing hydroxyl functions (—OH functions). Oxides of this type which may be mentioned are silica $SiO_2$, alumina $Al_2O_3$, zirconium oxide $ZrO_2$, cerium oxide $CeO_2$, titanium oxide $TiO_2$ and thorium oxide. Mention may also be made of supports based on combinations or mixtures of these oxides. $CeO_2/ZrO_2$ mixtures may be indicated more particularly, the respective proportions of the two oxides possibly varying within wide ranges. Mention may also be made of silica/alumina combinations or zeolites.

The support for the composition of the invention comprises, grafted to its surface, a group of formula (1) —M(OR)$_n$. The term "grafted" means that the group is chemically bonded to the support, in particular by a bond of covalent type. This grafting takes place using the hydroxyl groups of the support to give a bonding sequence A—O—M(OR)$_n$, A representing the metal element of the support. In the case of silica, for example, and using the silanol groups thereof, this will give Si—O—M(OR)$_n$ bonding sequences on the surface of the support.

In the group of formula (1), M is chosen from scandium, zirconium, hafnium, niobium, tantalum, rare-earth metals and actinides.

The expression "rare-earth" means the elements of the group consisting of yttrium and the elements of the Periodic Table of atomic number between 57 and 71 inclusive. The element M can be, more particularly, yttrium, lanthanum, samarium or neodymium.

In the case of the actinides, M can be, more particularly, uranium.

R is an organic group. It is generally a group containing from 1 to 100 carbon atoms, in particular from 1 to 50 carbon atoms. R can comprise one or more hetero atoms such as halogens, nitrogen, oxygen, sulphur, and phosphorus. R can be, more particularly, a saturated or unsaturated, linear or branched alkyl group, an aryl group, an aralkyl group or an alkaryl group. According to one specific embodiment, R is an alkyl group comprising from 1 to 18 carbon atoms such as a propyl group.

The value of n is not more than v−1, v being the maximum valency of the element M.

Preferably, the support is a support which has undergone a heat treatment, the purpose of which is to remove the free or adsorbed water, on the one hand, and, on the other hand, to control the density or the content of hydroxyl functions in the support. This content can be assayed chemically, for example by reaction of triethylaluminium and measurement of the volume of ethane gas evolved. It is thus sought by this heat treatment to obtain a density of hydroxyl functions which allows the metal to be bound to the support as far as possible by a single chemical bond.

In the case of silica, a silica with a BET specific surface from about 100 to about 700 m$^2$/g, more particularly between 250 and 350 m$^2$/g, is preferably used. For alumina, this surface can be between 150 and 250 m$^2$/g.

The expression "specific surface" means the BET specific surface determined by adsorption of nitrogen in accordance with ASTM standard D 3368-78 established from the Brunauer-Emmett-Teller method described in the periodical "Journal of the American Chemical Society, 60, 309 (1938)".

The process for preparing the composition of the invention will now be described.

This process comprises the formation of a suspension of the support and the reaction of this suspension with a compound of formula (2) M(OR)$_{n+1}$. The reaction takes place between the hydroxyl groups of the support and this compound to give the bonds which have been described above.

Preferably, the suspension is formed and the reaction is carried out under anhydrous conditions and in a solvent for the compound of formula (2). The solvent is generally a polar or non-polar anhydrous aprotic liquid. It can be chosen more particularly from products that are liquid under normal temperature and pressure conditions, for example hexane, benzene, toluene, xylenes, 1,2-dichloroethane, acetonitrile, dimethyl, sulphoxide, dimethylformamide and hexamethylphosphorotriamide.

The reaction is preferably carried out with an excess of the compound of formula (2) relative to the number of hydroxyl (—OH) sites present at the surface of the support. This excess can be from 1.5 to 2 times the number of hydroxyl sites.

The reaction is carried out by heating the reaction medium to a temperature which is not critical, which depends in particular on the nature of the solvent and which can be, for example, between 40 and 100° C.

After the reaction, the product obtained is separated from the reaction medium by any known means and maintained under an anhydrous atmosphere. After separation from the reaction medium, it can be washed with the abovementioned solvent. It is finally dried. If necessary, it can be stored in this same solvent.

According to one preferred variant, the support is subjected to a prior heat treatment. As indicated above, the purpose of this heat treatment is to obtain, a support without free or adsorbed water and with a controlled content of hydroxyl functions. This heat treatment is usually carried out by heating to temperatures of between 130° C. and 900° C. under vacuum or under inert gas. These temperatures depend on the nature of the support. They should be high enough to allow the removal of the free or adsorbed water and the control of the content of hydroxyl functions, but they should not exceed the temperatures of onset of sintering of the support concerned. Infrared analysis, for example, of the heat-treated support makes it possible to check whether or not the water has indeed been removed, after which the hydroxyl functions are assayed in the manner described above.

During the reaction between the compound of formula (2) and the hydroxyl groups of the support, a compound of formula ROH is formed. According to another variant of the invention, this compound of formula ROH is removed during the reaction, as it is formed.

It will be noted that it is possible to carry out the process which has just been described, not using a support as described above, but using a pre-grafted support, i.e. a support which comprises bonding sequences A—O—M(OR)$_n$ as described above at its surface. In this case, a suspension of the pre-grafted support is formed and is reacted with a compound of formula M(OR')$_{n+1}$ in which R' corresponds to the same definition as R, R and R' being different, under conditions such that bonding sequences A—O—M(OR')$_n$ are formed in replacement for the original bonding sequences A—O—M(OR)$_n$.

The present invention also relates to the use of a composition as described above or as can be obtained by the process described above, as a catalyst in a process of polymerization by opening oxygenated rings.

As products containing an oxygenated ring which are capable of being polymerized, mention may be made of alkyl oxides such as ethylene oxide or propylene oxide; cyclic esters such as lactones or lactides, or cyclic carbonates. The invention also applies to the copolymerization of products containing an oxygenated ring with each other or with $CO_2$.

The polymerization is carried out in the presence of a protic compound. This protic compound can be chosen from carboxylic acids, alcohols, thiols, glycols and polycols.

Alcohols of formula R'(OH)$_m$ in which m is an integer greater than or equal to 1 and R' represents an organic radical containing from 1 to 100 carbon atoms and more particularly from 1 to 50 carbon atoms optionally comprising one or more hetero atoms such as halogens, nitrogens, oxygen, sulphur and phosphorus, can be used in particular. R can be, more particularly, a saturated or unsaturated, linear or branched alkyl group, an aryl group, an aralkyl group or an alkaryl group. The alcohol can also contain reactive functions, such as an acrylate, styrene or maleate function or a halogen.

Alkyl groups which may be mentioned more particularly are isopropyl, hexyl and dodecyl groups. An aralkyl group which may be mentioned is benzyl alcohol. Groups comprising a hetero atom which may be mentioned are polyethers and perfluoroalkyls. As specific reactive functions or alcohols comprising a halogen, mention may be made of hydroxyethyl methacrylate, hydroxymethylstyrene and bromoundecanol.

Protic compounds which can also be used are organic acids of formula R'CO—(OH)$_m$, R' and m being defined as above. Mention may be made, for example, of the hemiester of maleic anhydride.

The polymerization is usually carried out in a solvent medium. A solvent for the polymer formed is chosen. This is an anhydrous aprotic solvent of the type described above.

The polymerization is carried out at a temperature which is high enough to give the reaction medium a viscosity which is not too high. Moreover, this temperature should not be too high, in order to avoid side reactions. Generally, the temperature is between 40 and 80° C. The reaction time can vary within a relatively wide range. This time can thus be from 1 minute to several hours.

The catalytic reaction is carried out according to the usual processes for reactors using solid catalysts and liquid effluents, in particular in a stirred bed or in a fixed bed, in a continuous or batchwise process.

The compositions of the invention are found to be particularly advantageous for carrying out ring-opening polymerizations in heterogeneous mode, these polymerizations having the characteristics of live polymerizations and allowing control of the molar mass by means of the amount of protic compound added. They allow the production of polymers of improved purity and of narrow molar mass distribution, as well as block or random copolymers.

Finally, the compositions of the invention can be reused after the polymerization and after simple washing with a protic compound which is identical to or different from the one used for the first polymerization.

The compositions of the invention with an alumina support are effective more particularly for the polymerization of alkyl oxides, especially ethylene oxide or propylene oxide. The compositions with a silica support are effective in particular for the polymerization of cyclic esters of the lactone type or cyclic carbonates.

Examples will now be given.

EXAMPLE 1

Production of a Silica Functionalized with Yttrium Isopropoxide

A Grace 432 silica pretreated thermally under the following conditions is used. The silica is heated from room temperature to 100° C. over 30 minutes, then from 130° C. to 450° C. over 1 hour and finally at 450° C. for 2 hours. Cooling takes place under a dynamic vacuum. 1 g of this silica suspended in 20 ml of toluene drive over 3 Å molecular sieves is introduced under argon into a Schlenck tube, followed by 2.2 ml of a 25% by weight yttrium isopropoxide solution (0.0018 mol of yttrium isopropoxide) (commercial solution in toluene, Strem reference 39–3000). After reaction for 3 hours at 500° C. the solid is washed with three times 10 ml of toluene. The residual liquid is removed and the solid is then dried at 50° C. under the vacuum of a vane pump. The dried solid is kept under argon in a Schlenck tube. The amount of yttrium isopropoxide bound to the silica is measured by elemental analysis of the yttrium and carbon (Y=11.4% by weight; C=2.14% by weight). Under these conditions, there are as many yttrium atoms bound as there are hydroxyl functions borne by the silica.

EXAMPLE 2
Polymerization of $\epsilon$-caprolactone with Silica-supported Yttrium Isopropoxide in the Presence of Isopropanol 500 mg of the silica functionalized according to the method described in Example 1 (supporting 0.0006 mol of yttrium) are introduced under argon onto a Schlenck tube and suspended in 30 ml of toluene dried over 3 Å molecular sieves at 50° C. 0.45 ml of isopropanol (0.006 mol) and 8 ml of $\epsilon$-caprolactone (0.072 mol) are added to the suspension. The polymerization reaction is monitored by gas chromatography (internal standard: 1,2-dichloroethane dried over 3 Å molecular sieves). The polymerization is complete in 10 minutes. 5 ml of ethanol are added to the suspension to free the polymer chains bound to the silica and the silica is allowed to separate out by settling. The polymer solution is then filtered and the polymer is recovered by evaporating off the solvent under vacuum on a rotary evaporator. 8.2 g of polymer are obtained. The polymer is analysed by proton and carbon-13 nuclear magnetic resonance. The number-average degree of polymerization is deduced from the ratio: incorporated lactone/isopropoxy at the start of the chain, and is equal to 10.

The NMR analysis shows that there are as many isopropoxy groups at the start of the chain as there are alcohol functions at the end of the chain, which demonstrates the live nature of the polymerization.

EXAMPLE 3
Production of a Silica Functionalized with Yttrium Benzylate and Subsequent Polymerization of $\epsilon$-caprolactone 500 mg of the silica functionalized according to the method described in Example 1 (supporting 0.0006 mol of yttrium) are introduced under argon into a Schlenck tube and suspended in 30 ml of toluene dried over 3 Å molecular sieves at 50° C. 1.2 ml benzyl alcohol (0.012 mol) are added the mixture is left to react at 50° C. for 1 hour. This mixture is then washed with three times 10 ml of toluene to remove the isopropanol released and the excess benzyl alcohol. The supernatant liquid is removed and the solid is dried at 50° C. under the vacuum of a vane pump. This solid is suspended in 30 ml of toluene.

0.6 ml of benzyl alcohol (0.006 mol) and 8 ml of $\epsilon$-caprolactone (0.072 mol) are added to the suspension. The polymerization reaction is monitored by gas chromatography (internal standard: 1,2-dichloroethane dried over 3 Å molecular sieves). The polymerization is complete in 10 minutes. 5 ml of ethanol are added to the suspension to free the polymer chains bond to the silica. After separating out the silica by settling, the polymer solution is filtered and the polymer is recovered by evaporating off the solvent under vacuum on a rotary evaporator. 9 g of polymer are obtained. The polymer is analysed by proton and carbon-13 nuclear magnetic resonance. The number-average degree of polymerization is deduced from the ratio: incorporated lactone/benzyloxy at the start of the chain, and is equal to 10.

EXAMPLE 4
Production of a Silica Functionalized with Neodymium Isopropoxide and Polymerization of $\epsilon$-caprolactone 1 g of Grace 432 silica, preheated at 450° C. under the conditions described in Example 1, suspended in 20 ml of toluene dried over 3 Å molecular sieves is introduced under argon into a Schlenck tube, followed by 580 mg of neodymium isopropoxide (0.0018 mol, Strem product, reference 93.6012). After reaction for 3 hours at 50° C., the solid is washed with three times 10 ml of toluene, the residual liquid is removed and the solid is then dried at 50° C. under the vacuum of a vane pump. The dried solid is kept under argon in a Schlenck tube. The amount of neodymium isopropoxide bound to the silica is measured by elemental analysis of the neodymium and carbon (Nd=15.5% by weight; C=3.43% by weight). Under these conditions, there are as many neodymium atoms bound as there are hydroxyl functions borne by the silica.

500 mg of this functionalized silica are used for the polymerization of $\epsilon$-caprolactone according to the method described in Example 2. The reaction is complete in 30 minutes.

EXAMPLE 5
Production of an Alumina Functionalized with Neodymium Isopropoxide A Procatalyse alumina pretreated thermally under the conditions below is used. The alumina is heated from room temperature to 100° C. over 30 minutes, then from 100° C. over 30 minutes, then from 130° C. to 200° C. over half an hour and finally at 200° C. for 2 hours. The cooling takes place under a dynamic vacuum.

1 g of this alumina (containing $1.6 \times 10^{-3}$ mol of OH) suspended in 20 ml of toluene dried over 3 Å molecular sieves is placed in a Schlenck tube under argon, followed by 770 mg of neodymium isopropoxide ($2.4 \times 10^{-3}$ mol) (Strem product).

After reaction for 3 hours at 50° C., the solid is washed with three times 10 of toluene, the residual liquid is removed and the solid is then dried at 50° C. under the vacuum of a vane pump. The dried solid is kept under argon in a Schlenck tube. The amount of neodymium isopropoxide bound to the alumina is measured by elemental analysis of the neodymium and carbon (Nd=8.24% by weight; C=2.12% by weight). Under these conditions, there is $7.9 \times 10^{-4}$ mol of neodymium grafted onto 1 g of alumina.

EXAMPLE 6
Polymerization of Ethylene Oxide with Alumina-supported Neodymium Isopropoxide in the Presence of Isopropanol 500 mg of alumina functionalized according to the method described in Example 5 (supporting $3.95 \times 10^{-4}$ mol of neodymium) are suspended under argon in a 250 ml round-bottomed flask containing 40 of toluene dried over 3 Å molecular sieves and equipped with a magnetic stirrer, a thermocouple, a pressure sensor and a dropping funnel containing ethylene oxide which has been predistilled under vacuum.

0.3 ml of isopropanol (0.004 mol) is added to the flask. The flask is placed under vacuum using a vane pump (the residual vacuum being the vapour pressure of the liquids contained in the flask) and is heated to 55° C.

2.4 ml of ethylene oxide (0.048 mol) are added slowly to the suspension. The polymerization reaction is monitored by the pressure sensor. At the end of the polymerization. (return to the original pressure), 5 of ethanol are added to the suspension to free the polymer chains bound to the alumina. After separation of the alumina by settling, the polymer solution is filtered and the polymer is recovered by evaporating off the solvent under vacuum on a rotary evaporator. 5 g of polymer are obtained. The polymer is analysed by proton and carbon-13 nuclear magnetic resonance. The number-average degree of polymerization is deduced from the ratio: ethoxy incorporated/isopropoxy at the start of the chain, and is equal to 10.

EXAMPLE 7
Production of an Alumina Functionalized with Samarium Isopropoxide 1 g of Procatalyse alumina pretreated at 450° C. according to the method described in Example 1 (containing $0.8 \times 10^{-3}$ mol of OH) suspended in 20 ml of toluene dried over 3 Å molecular sieves is placed in a Schlenck tube under argon, followed by 0.393 mg of samarium isopropoxide ($1.2 \times 10^{-3}$ mol) (Strem product reference 93.6214).

After reaction for 3 hours at 50° C., the solid is washed with three times 10 ml of toluene, the residual liquid is removed and the solid is then dried at 50° C. under the vacuum of a vane pump. The dried solid is kept under argon in a Schlenck tube. The amount of samarium isopropoxide bound to the alumina is measured by elemental analysis of the samarium and carbon (Sm=3.20% by weight; C=3.15% by weight). Under these conditions, there is $2.32 \times 10^{-4}$ mol of samarium grafted onto 1 g of alumina.

EXAMPLE 8
Polymerization of Propylene Oxide with Alumina-supported Samarium Isopropoxide in the Presence of Isopropanol 500 mg of alumina functionalized according to the method described in Example 7 (supporting $1.16 \times 10^{-4}$ mol of samarium) are suspended under argon in a 250 ml round-bottomed flask containing 40 ml of toluene dried over 3 Å molecular sieves and equipped with a magnetic stirrer, a thermocouple, a pressure sensor and a dropping funnel containing propylene oxide which has been presdistilled under vacuum over calcium hydride.

0.18 ml of isopropanol (0.0023 mol) is added to the flask. The flask is placed under vacuum using a vane pump (the residual vacuum being the vapour pressure of the liquids contained in the flask) and is heated to 55° C.

3.5 ml of propylene oxide (0.05 mol) are added slowly to the suspension. The polymerization reaction is monitored by the pressure sensor. At the end of the polymerization (return to the original pressure), 5 ml of ethanol are added to the suspension to free the polymer chains bound to the alumina. After separation of the alumina by settling, the polymer solution is filtered and the polymer is recovered by evaporating off the solvent under vacuum on a rotary evaporator. 4.4 g of polymer are obtained. The microstructure of the polymer is determined by proton and carbon-13 nuclear magnetic resonance. The number-average degree of polymerization is deduced from the ratio: propoxy incorporated/isopropoxy at the end of the chain, and is equal to 20.

EXAMPLE 9
Production of an Alumina Functionalized with Zirconium Isobutoxide and Use for the Preparation of Propylene Oxide/ ethylene Oxide Block Copolymers 1 g of Procatalyse alumina pretreated at 450° C. according to the method described in Example 1 (containing $0.8 \times 10^{-3}$ mol of OH) suspended in 20 ml of toluene dried over 3 Å molecular sieves is placed in a Schlenck tube under argon, followed by 0.8 ml of a commercial solution of zirconium isobutoxide (Strem, reference 93.4003). After reaction for 3 hours at 50° C., the solid is washed with three times 10 ml of toluene, the residual liquid is removed and the solid is then dried at 50° C. under the vacuum of a vane pump. The amount of zirconium isobutoxide bound to the alumina is measured by elemental analysis of the zirconium and carbon (Zr=1.45% by weight; C=4.48% by weight).

The product thus prepared is suspended under argon in a 250 ml round-bottomed flask containing 40 ml of toluene dried over sieves and equipped with a magnetic stirrer, a thermocouple, a pressure sensor and a dropping funnel containing propylene oxide which has been predried over sodium hydride. 0.18 ml of benzyl alcohol ($1.76 \times 10^{-3}$ mol) is added to the flask. The flask is placed under vacuum using a vane pump and is heated to 55° C. 1.6 ml of propylene oxide (0.0299 mol) are added slowly to the suspension. The polymerization reaction is monitored by the drop in pressure in the flask. At the end of the reaction, the system is again placed under argon and 40 ml of toluene are introduced. The flask is placed under vacuum and heated to 55° C. 1.15 ml of ethylene oxide (0.0299 mol) are added slowly. At the end of the polymerization (return to the original pressure), 5 ml of ethanol are added to the suspension to free the polymer chains bound to the alumina. After separation of the alumina by settling, the copolymer solution is filtered and the copolymer is recovered by evaporating off the solvent under vacuum on a rotary evaporator. 3 g of copolymer are obtained. The copolymer is characterized by proton and carbon-13 nuclear magnetic resonance. The characteristic PO-EO alternation of the block copolymer is noted in particular.

EXAMPLE 10
Polymerization of 2,2-dimethyltrimethylene Carbonate with Silica-supported Yttrium Benzylate in the Presence of Benzyl Alcohol 500 mg of the silica functionalized according to the method described in Example 1 (supporting 0.0006 mol of yttrium) are introduced under argon into a Schlenck tube and suspended in 30 ml of toluene dried over 3 Å molecular sieves at 50° C. 1.2 ml of benzyl alcohol (0.012 mol) are added and the mixture is allowed to react at 50° C. for 1 hour. This mixture is then washed with three times 10 ml of toluene to remove the isopropanol released and the excess benzyl alcohol.

0.6 ml of benzyl alcohol (0.006 mol) and 7.8 g of 2,2-dimethyltrimethylene carbonate (0.06 mol) dissolved in 75 ml of dry toluene are added to the suspension. The polymerization reaction is monitored by steric exclusion chromatography and by proton nuclear magnetic resonance. The polymerization is complete in 5 minutes. 5 ml of ethanol are added to the suspension to free the polymer chains bound to the silica, the polymer solution is filtered and the polymer is recovered by evaporating off the solvent on a rotary evaporator. 8 g of polymers are obtained. The polymer is analysed by proton and carbon-13 nuclear magnetic resonance. The number-average degree of polymerization is deduced from the ratio; cyclic carbonate incorporated/ benzyloxy unit at the start of the chain, and is equal to 10.

What is claimed is:

1. A process of polymerization of monomers having oxygenated rings by opening the oxygenated rings, said process comprising the step of using as a catalyst for said polymerization a composition comprising a support of a metal oxide containing hydroxyl functions, onto which is grafted a group of formula (1):

—M(OR)$_n$ wherein M is scandium, zirconium, hafnium, niobium, tantalum, a rare-earth metal or an actinide, R is an organic group and n is an integer greater than or equal to 1, in the presence of a protic compound.

2. A process according to claim 1, wherein the support is silica, alumina, zirconium oxide, cerium oxide, titanium oxide or thorium oxide.

3. A process according to claim 1, wherein M is yttrrium, lanthanum, samarium or neodymium.

4. A process according to claim 1, wherein R is a saturated linear alkyl group, an unsaturated linear alkyl group, a saturated branched alkyl group, an unsaturated branched alkyl group, an aryl group, an aralkyl group or an alkaryl group.

5. A process according to claim 1, wherein the support is an oxide and wherein free or adsorbed water has been removed from the support.

6. A process according to claim 1, wherein the oxygenated rings are alkyl oxides, cyclic esters or cyclic carbonates.

7. A process according to claim 1, wherein the polymerization is performed in a solvent medium.

8. A process according to claim 1, wherein the protic compound is a carboxylic acid, an alcohol, a thiol, a glycol or a polyol.

9. A process according to claim 6, wherein the oxygenated ring is an alkyl oxide and wherein the support is alumina.

10. A process according to claim 9, wherein the oxygenated ring is ethylene oxide or propylene oxide.

11. A process according to claim 6, wherein the oxygenated ring is a cyclic ester and wherein the support is silica.

12. A process according to claim 1, wherein the monomers are copolymerized, with each other or with $CO_2$.

* * * * *